(12) United States Patent
Loheide et al.

(10) Patent No.: US 10,887,637 B2
(45) Date of Patent: *Jan. 5, 2021

(54) CREATION OF CHANNEL TO SUPPORT LEGACY VIDEO-ON-DEMAND SYSTEMS

(71) Applicant: Turner Broadcasting System, Inc., Atlanta, GA (US)

(72) Inventors: Donald Jude Loheide, Mableton, GA (US); Steven Ernest Riedl, Atlanta, GA (US); Mark Cooper Pope, V, Atlanta, GA (US); Nishith Kumar Sinha, Mableton, GA (US)

(73) Assignee: TURNER BROADCASTING SYSTEM, INC., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/701,378

(22) Filed: Dec. 3, 2019

(65) Prior Publication Data
US 2020/0107059 A1    Apr. 2, 2020

Related U.S. Application Data

(63) Continuation of application No. 15/395,296, filed on Dec. 30, 2016, now Pat. No. 10,567,821.

(51) Int. Cl.
*H04N 21/262* (2011.01)
*H04N 21/235* (2011.01)
(Continued)

(52) U.S. Cl.
CPC ....... *H04N 21/262* (2013.01); *H04N 21/2187* (2013.01); *H04N 21/2358* (2013.01); *H04N 21/26258* (2013.01); *H04N 21/812* (2013.01)

(58) Field of Classification Search
CPC ............. H04N 21/812; H04N 21/2187; H04N 21/2358; H04N 21/2662; H04N 21/263; H04N 21/262; H04N 21/26258
(Continued)

(56) References Cited

U.S. PATENT DOCUMENTS 7,254,285 B1    8/2007 Paek et al.
2004/0117429 A1*    6/2004 Karaoguz ............. H04N 7/163
709/200
(Continued)

OTHER PUBLICATIONS

Non-Final Office Action for U.S. Appl. No. 16/114,426 dated Mar. 12, 2020.
(Continued)

*Primary Examiner* — Cynthia M Fogg
(74) *Attorney, Agent, or Firm* — Chip Law Group

(57) ABSTRACT

A television playout system provided in a broadcast provider system receives a playout schedule, which corresponds to a live video feed of a channel broadcasted to one or more multichannel video program distributors (MVPDs), from a playout schedule source, and generates a new channel comprising one or more video on demand (VOD) content assets, based on one or more scheduling rules of the playout schedule, to be transmitted to a plurality of MVPDs at a time specified in the received playout schedule. The received live video feed of the channel is sanitized by removal of a lower third graphical content overlay from the live video feed for the generation of the new channel. A discontinuity is inserted between program segments to allow dynamic ad insertion (DAI) within the program segments of the live video feed for the new channel.

21 Claims, 6 Drawing Sheets

(51) Int. Cl.
*H04N 21/81* (2011.01)
*H04N 21/2187* (2011.01)

(58) Field of Classification Search
USPC .......................................................... 725/32
See application file for complete search history.

(56) References Cited

U.S. PATENT DOCUMENTS

| | | | |
|---|---|---|---|
| 2010/0199299 A1* | 8/2010 | Chang | H04N 21/4821 |
| | | | 725/32 |
| 2011/0022471 A1* | 1/2011 | Brueck | G06Q 30/02 |
| | | | 705/14.61 |
| 2012/0291079 A1 | 11/2012 | Gordon et al. | |
| 2014/0310600 A1* | 10/2014 | BianRosa | H04N 21/8405 |
| | | | 715/719 |
| 2017/0064400 A1* | 3/2017 | Riegel | H04N 21/2743 |
| 2017/0099149 A1 | 4/2017 | Eber et al. | |
| 2017/0251247 A1* | 8/2017 | Lee | H04N 21/44204 |

OTHER PUBLICATIONS

Advisory Action for U.S. Appl. No. 16/114,426 dated Jan. 31, 2020.
Corrected Notice of Allowance for U.S. Appl. No. 15/395,296 dated Jan. 22, 2020.
Final Office Action for U.S. Appl. No. 16/114,426 dated Jun. 23, 2020.
Non-Final Office Action for U.S. Appl. No. 16/114,426 dated Oct. 22, 2020.

* cited by examiner

CREATION OF CHANNEL TO SUPPORT LEGACY VIDEO-ON-DEMAND SYSTEMS

CROSS-REFERENCE TO RELATED APPLICATIONS/INCORPORATION BY REFERENCE

This patent application makes reference to, claims priority to, claims the benefit of, and is a Continuation Application of U.S. patent application Ser. No. 15/395,296, filed Dec. 30, 2016.

This application also makes reference to U.S. application Ser. No. 15/395,206, filed Dec. 30, 2016.

The above referenced application is hereby incorporated herein by reference in its entirety.

FIELD OF TECHNOLOGY

Certain embodiments of the disclosure relate to a television broadcast system. More specifically, certain embodiments of the disclosure relate to a method and system for creation of channel to support legacy video-on-demand systems.

BACKGROUND

The past decade has witnessed a massive expansion of live web simulcast services in the field of advertisement-based broadcasting and cable networking systems. One of various examples of such live web simulcast services is providing video-on-demand (VOD) content by a content provider system to a multichannel video program distributor (MVPD) when demanded by a viewer via a traditional cable set-top box with limited bandwidth and resources. For such content delivery, the content provider system encodes the VOD content at a specific bitrate, such as mezzanine bitrate, and decides a specific format, such as "C3" VOD, according to a programming schedule.

In certain scenarios, the content provider system may be required to re-encode the VOD content at appropriate high definition (HD) or standard definition (SD) formats. Further, files, for example, asset distribution interface (ADI) metadata that accompanies the VOD content, may be required to be reprocessed by a third party to redistribute the VOD content as a high priority pitch to the MVPDs. Such re-encoding and pitching process may increase the overall cost and time to get the VOD content live on the MVPDs' VOD systems. This time period corresponds to a duration when a large portion of the C3 viewing (refers to delayed viewing of live content by a certain duration, such as 75 Hours for example) takes place and thus, results in costing the content provider rating points and therefore a loss in revenue generated from advertisements. Thus, there is a need for a dynamic VOD content assets generating system that can reduce the cost and speed up the delivery of the VOD content from the content provider to the MVPDs associated with traditional VOD distribution systems while maintaining appropriate content rights.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for creation of channel to support legacy video-on-demand systems, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and system for creation of channel to support legacy video-on-demand systems. Various embodiments of the disclosure provide a method and system that generates a new channel comprising one or more VOD content assets, based on one or more scheduling rules of the playout schedule. In accordance with various embodiments of the disclosure, a television playout system provided in a broadcast provider system, receives a playout schedule, which corresponds to a live video feed of a channel broadcasted to a plurality of MVPDs, from a playout schedule source. A new channel for one or more VOD content assets may be generated based on one or more scheduling rules of the playout schedule, to be transmitted to the plurality of MVPDs at a time specified in the received playout schedule.

In accordance with an embodiment, the received live video feed of the channel may be sanitized by removal of a lower third graphical content overlay from the live video feed for the generation of the new channel. In accordance with an embodiment, a discontinuity may be inserted between program segments to allow dynamic ad insertion (DAI) within the program segments of the live video feed for the new channel. In accordance with an embodiment, a unique source identifier/time in content may be inserted in the live video feed for the new channel. In accordance with an embodiment, new promotional content items, specific to a content provider associated with the broadcast provider system of the live video feed, may be inserted for the new channel.

The generated new channel may be encoded with channel metadata. The channel metadata includes at least digital rights associated with the live video feed, timing information associated with one or more commercial breaks, a program schedule based on which the one or more advertisements within one or more program segments of the live video feed, and signaling content of the live video feed. The encoded new channel may be delivered to the plurality of MVPDs via a new communication medium in network at the time specified in the received playout schedule.

Figure 1A:
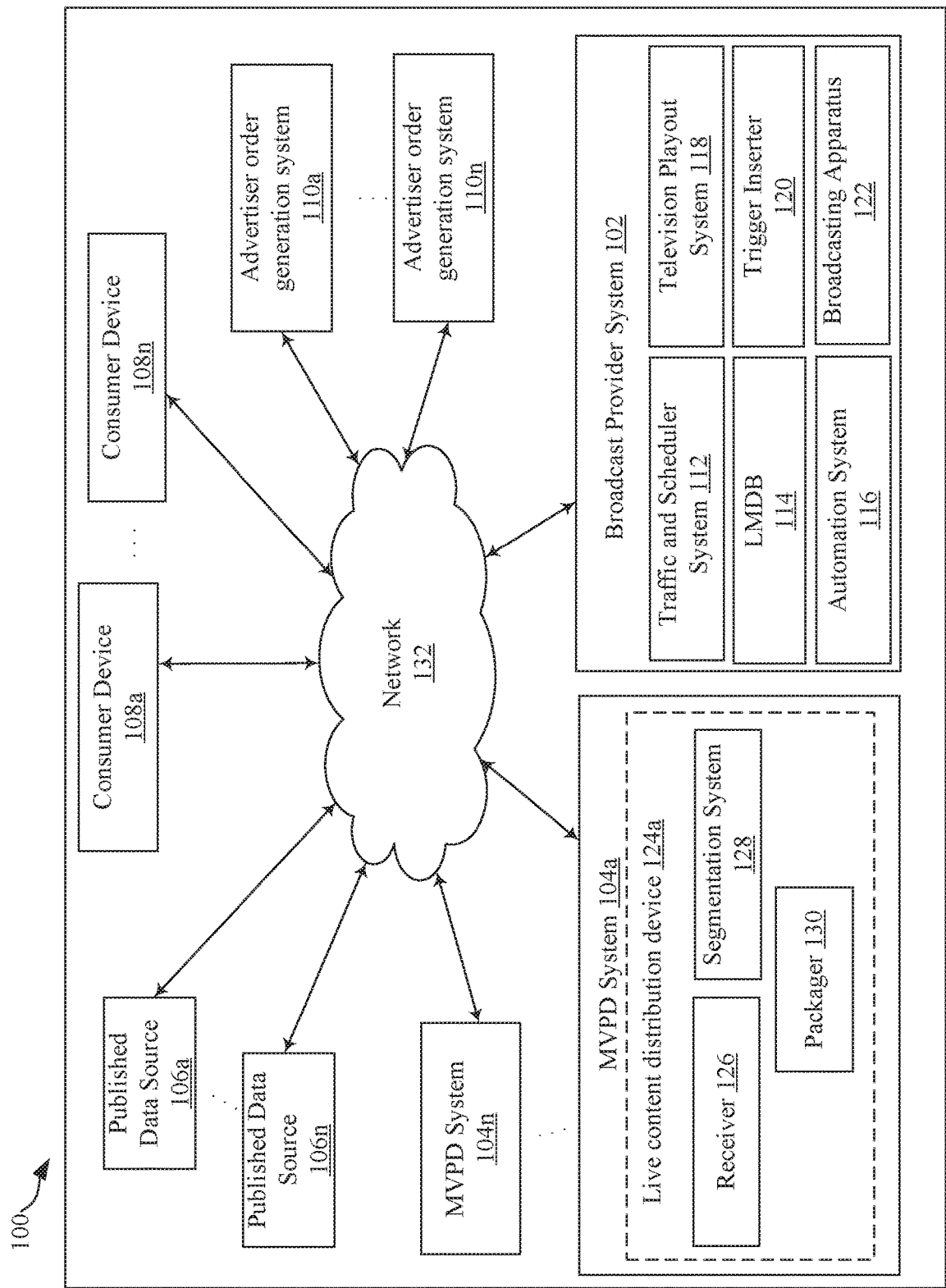
FIG. 1A is a block diagram that illustrates an exemplary system for dynamic generation of video-on-demand (VOD) assets for multichannel video programming distributors (MVPDs), in accordance with an exemplary embodiment of the disclosure.

FIG. 1A is a block diagram that illustrates an exemplary system for dynamic generation of VOD assets for MVPDs, in accordance with an exemplary embodiment of the disclosure. Referring to FIG. 1A, the system 100, comprises a broadcast provider system 102, a plurality of MVPD systems 104a, ..., 104n, a plurality of published data sources 106a, ..., 106n, a plurality of consumer devices 108a, ..., 108n, and a plurality of advertiser order generation systems 110a, ..., 110n. The broadcast provider system 102 may include a traffic and scheduler system 112, a live metadata database (LMDB) 114, an automation system 116, a television playout system 118, a trigger inserter 120, and a broadcasting apparatus 122. Each of the plurality of MVPD systems 104a, ..., 104n may include a live content distribution device of the plurality of live content distribution devices 124a, ..., 124n. Each live content distribution device of the plurality of live content distribution devices 124a, ..., 124n, such as the live content distribution devices 124a, may include a receiver 126, a segmentation system 128, and a packager 130. There is further shown a network 132 through which the broadcast provider system 102, the plurality of MVPD systems 104a, ..., 104n, the plurality of published data sources 106a, ..., 106n, the plurality of consumer devices 108a, ..., 108n, and the plurality of advertiser order generation systems 110a, ..., 110n are communicatively coupled with each other.

The broadcast provider system 102 may comprise suitable logic, circuitry, and interfaces that may be configured to execute code that communicate a linear video feed (also referred to as a network television feed or broadcast feed) and corresponding playout schedule to the plurality of MVPD systems 104a, ..., 104n. In a broadcast chain, the broadcast provider system 102 may receive actual content, for example, from a production studio, in a serial digital interface (SDI) video interface and/or on a high-definition SDI (HD-SDI) video interface, process the content, such as insertion of graphics, closed captions, preparation of programming schedule, insertion of triggers, and the like, and final delivery by the broadcasting apparatus 122. The communicated linear video feed and the playout schedule may correspond to a channel, such as CNN channel that is broadcast to the plurality of MVPD systems 104a, ..., 104n, via a communication network, such as the network 132. The linear video feed may be broadcasted as a multi-program transport stream (MPTS) (also referred to as a live video feed) to the plurality of MVPD systems 104a, ..., 104n, via the network 132. The broadcast provider system 102 may be owned by (or associated to) a broadcast provider or operator, a network provider or operator, or a content provider or operator.

Each of the plurality of MVPD systems 104a, ..., 104n may comprise suitable logic, circuitry, and interfaces that may be configured to provide video programming services to viewers, usually for a subscription fee (such as pay television). Each of the plurality of MVPD systems 104a, ..., 104n may comprise a headend where the MVPD system assembles and prepares its multiple channels of video programming for distribution to the viewers. Each of the plurality of MVPD systems 104a, ..., 104n may receive the MPTS, which includes the signaling content and metadata, from the broadcast provider system 102 based on current society of cable telecommunication engineers (SCTE) standards (SCTE-35 and SCTE-224) to control web and regional blackouts, network end of day switching, and advertisement insertion. For example, the plurality of MVPD systems 104a, ..., 104n may be signaled for various blackout types with in-band SCTE-35 message. Further, the plurality of MVPD systems 104a, ..., 104n may receive program metadata that specifies certain events or operations, such as, for example, when to blackout shows, recording programs off the live video feed for startover or Cx (x is an integer representing the number of day since original airing) (VOD) packaging, with SCTE-224 message. Examples of the plurality of MVPD systems 104a, ..., 104n may include direct-broadcast satellite (DBS) providers, cable television (CATV) systems, and other wireline video providers and competitive local exchange carriers (CLECs) using IPTV.

Each of the plurality of published data sources 106a, ..., 106n may comprise suitable logic, circuitry, and interfaces that may be configured to execute code that provides actual viewership or rating for programs that were aired. As illustrated in FIG. 1A, the plurality of published data sources 106a, ..., 106n are coupled to the broadcast provider system 102 via the network 132. An exemplary published data source may be Nielsen. Nielsen has the capability to determine when a viewer watches the same set of media items, i.e. advertisements and/or promotional content, in programming data, such as an episode, in a live video feed within 3 days of original airing, and provide Nielsen "C3" credit. In accordance with an embodiment, based on the Nielsen "C3" credit, the broadcast provider system 102 may be configured to generate a new channel, "D4 channel", which may be broadcasted on day "4" of the originally aired live video feed. Another exemplary published data source may be a published database that provides ratings for media items, such as GRP. The GRP is an advertising impact measure or a promotion impact measure for each advertising and/or promotional campaigns, known in the art.

The consumer devices 108a, ..., 108n may refer to end-user devices where the one or more VOD assets are rendered to be viewed by a viewer. The number of impressions of a media item, such as an advertisement and/or promotional content, on such plurality of consumer devices 108a, ..., 108n determines the advertising impact or promotion impact and number of actual viewership achieved during campaigns. Examples of the consumer devices 108a, ..., 108n may include, but are not limited to, connected TVs, connected TV with paired devices (e.g., tablets), and second screen devices such as smartphones and tablets.

Each of the plurality of advertiser order generation systems 110a, ..., 110n may comprise suitable logic, circuitry, and interfaces that may be configured to place orders with the broadcast provider system 102 that may include information about type of spots to be broadcast, the number of spots to be broadcast, and when the spots should be aired. The broadcast provider system 102 may be configured to electronically receive, via a communication network, deals comprising advertisers' orders from the plurality of advertiser order generation systems 110a, ..., 110n. The traffic and scheduler system 112 may be configured to receive an advertiser's order to place one or more spots into one or more commercial breaks. The advertiser order generation systems 110*a*, . . . , 110*n* may provide multiple orders, which need not be submitted at the same time. Therefore, the traffic and scheduler system 112 may continuously receive orders with new or additional spots to be placed and may need to update any previously determined commercial break schedule to accommodate the constraints and requirements of those spots already placed and of the new spots being received. In this regard, the advertiser order generation systems 110*a*, . . . , 110*n* may electronically book spots to a selling title, and within the selling title there are constraints. The advertiser's order comprises airing constraints and placement requirements corresponding to the one or more spots.

The traffic and scheduler system 112 may comprise suitable logic, circuitry, and interfaces that may be configured to execute code that receives an advertiser's orders to place one or more spots into one or more commercial breaks. The received orders are queued and placements of a plurality of advertisements in the incoming linear video feed are determined. The plurality of advertisements are placed into one or more commercial breaks (also referred to as advertisement space) appearing in a same selling title or different selling titles of the linear video feed. A selling title is an interval of programming time that the broadcast provider system 102 utilizes to sell commercial airtime. In some cases, the term daypart may be utilized as an alternative name for a selling title, but in other cases a daypart may be an aggregation of selling titles. In accordance with an embodiment, the traffic and scheduler system 112 may be configured to determine a playout schedule based on the placement of the plurality of advertisements into the commercial breaks in the incoming linear video feed. In accordance with an embodiment, the traffic and scheduler system 112 may receive the playout schedule and/or a specific playout schedule from the source device 133. In accordance with an embodiment, the traffic and scheduler system 112 may be implemented as distinct entities, for example as a traffic system and a scheduler, as described in FIG. 1B.

The LMDB 114 may comprise suitable logic, circuitry, and interfaces that may be configured to store metadata related to the programing data in the linear video feed provided by one or more components of the broadcast provider system 102, such as the traffic and scheduler system 112 and the automation system 116. The LMDB 114 may be configured to receive metadata from the traffic and scheduler system 112 and the television playout system 118. The LMDB 114 may be configured to distribute such program metadata to the plurality of MVPD systems 104*a*, . . . , 104*n* or external affiliates for individual networks via SCTE-224 (originally DVS1179) message. The SCTE-224 specification defines encryption, timings and basic program information to distribute, and other information to look for in the broadcast live video feed to indicate program starts and stops. The LMDB 114 may be further configured to update the metadata in real-time based on information related to at least a playout schedule of programming data, advertisement and promotional content, an updated playout schedule, and titles associated with the programming data.

The automation system 116 may comprise suitable logic, circuitry, and interfaces that may be configured to execute code that coordinates the television playout system 118 with the trigger inserter 120 based on the playout schedule received from the traffic and scheduler system 112. The automation system 116 may coordinate the television playout system 118 with the trigger inserter 120 for insertion of a plurality of triggers in an uncompressed SDI video of a channel before broadcast. In accordance with an embodiment, the automation system 116 may be configured to generate a new channel based on one or more scheduling rules of the specific playout schedule, to be transmitted to the plurality of MVPD systems 104*a*, . . . , 104*n* at a time specified in the received specific playout schedule. In one embodiment, the time may be specified by metadata. In another embodiment, the time may be specified inband with the content.

The television playout system 118 may comprise suitable logic, circuitry, and interfaces that may be configured to execute code that handles a playout of a channel (such as a television channel). In this regards, the television playout system 118 may adjust a plurality of splice points that demarcates different media items, such as a transition point from a TV program to an advertisement or a promotional media, in a linear video feed (uncompressed SDI video) of the channel to maintain the playout schedule. The television playout system 118 may be operated by the broadcast provider system 102 for managing a single channel or a plurality of channels. In accordance with an embodiment, the television playout system 118 may be configured to store and deliver playout of the linear video feed with broadcast chain elements, for example, such as graphics, closed captions, Nielson markers, format definition data, vertical interval time codes (VITC), and the like.

The trigger inserter 120 may comprise suitable logic, circuitry, and interfaces that may be configured to execute code that handles insertion of SCTE 104/35, a plurality of cues or triggers in the linear video feed. In this regard, the trigger inserter 120 may be configured to insert the plurality of cues or triggers as per SCTE-104-based digital ad-marker or society of motion picture and television engineers (SMPTE) 2010 standards in coordination with the automation system 116. Various examples of such plurality of cues or triggers may be splice points, such as program start, program end, content placement opportunity start/end, commercial break start, commercial break end, promotional content start, promotional content end, advertisement start/end, and the like.

The broadcasting apparatus 122 may be a device which broadcasts an electromagnetic signal corresponding to one or more television channels to the plurality of MVPD systems 104*a*, . . . , 104*n*. The broadcasting apparatus 122 may be analog or digital. In an example, the broadcasting apparatus 122 transmits channels that are unencrypted and therefore free-to-air or free-to-view. In another example, the broadcasting apparatus 122 transmits channels with encryption (pay television), and thus requiring a subscription by the plurality of consumer devices 108*a*, . . . , 108*n* via the plurality of MVPD systems 104*a*, . . . , 104*n*. In such a case, the encryption may be based on conditional access (CA) or digital rights management (DRM) technology, known in the art. The broadcasting apparatus 122 may act as a source device or a source of receipt of the broadcast feed of one or more channels for the plurality of MVPD systems 104*a*, . . . , 104*n*.

Each of the plurality of live content distribution devices 124*a*, . . . , 124*n* in the corresponding MVPD system of the plurality of MVPD systems 104*a*, . . . , 104*n* may comprise suitable logic, circuitry, and interfaces that may be configured to execute code to dynamically generate VOD content assets. Consequently, the plurality of live content distribution devices 124*a*, . . . , 124*n* may be referred to as a live catcher as it allows capture (a recording) of a live video feed (a broadcast feed received from the broadcasting apparatus 122 of the broadcast provider system 102), which is used to create VOD content assets at the plurality of MVPD systems 104a, ..., 104n.

Figure 1B:
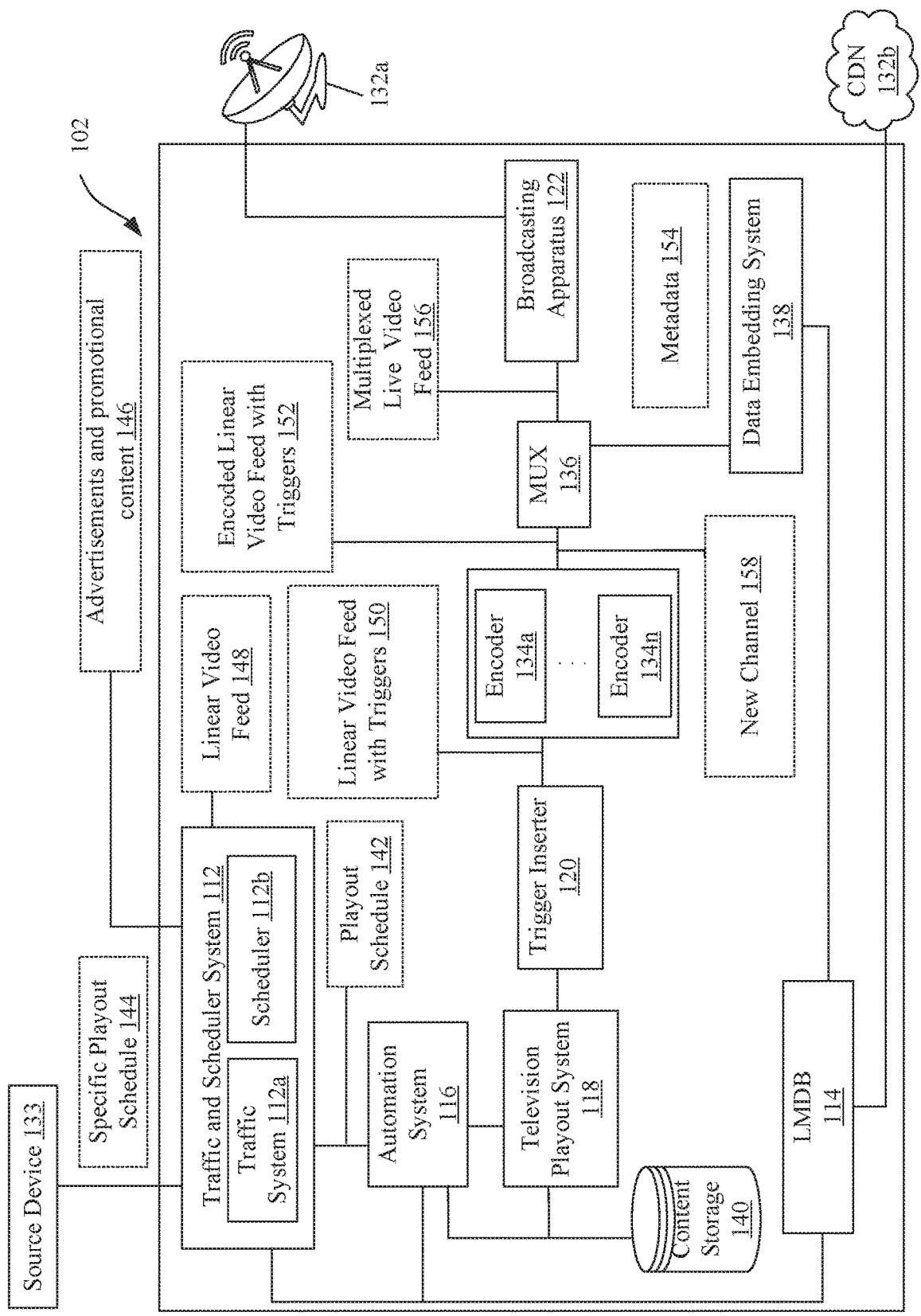
FIG. 1B is a block diagram that illustrates an exemplary broadcast provider system for broadcasting encoded video feed of a channel to a plurality of MVPDs and generating a new channel comprising one or more VOD content assets, in accordance with an exemplary embodiment of the disclosure.

The receiver 126 may comprise suitable logic, circuitry, and interfaces that may be configured to execute code that receives the live video feed from the broadcast provider system 102, via the network 132 (such as a satellite communication network 132a as shown in FIG. 1B), encrypted based on the CA and/or DRM technology.

The segmentation system 128 may comprise suitable logic, circuitry, and interfaces that may be configured to execute code to determine a plurality of segments (or chunks) in the received live video feed based on the received plurality of triggers and metadata. The segmentation system 128 may be further configured to store the plurality of segments (or chunks) at a storage space provided in the corresponding live content distribution device.

The packager 130 may comprise suitable logic, circuitry, and interfaces that may be configured to execute code to determine a package that includes content and associated metadata. The content may correspond to one or more of the plurality of segments transcoded to different types of streams for different types of devices, such as a TV or a mobile device, and marked with Nielson markers. Based on such a package, a corresponding live content distribution device may dynamically generate one or more VOD content assets for playout to one or more servers communicatively coupled with the corresponding MVPD system. The packager 130 may be directly or indirectly coupled to a local storage (not shown).

The packager 130 may be configured to publish the one or more VOD content assets in real-time or near real-time. The packager 130 may be operable to create "C3" content assets and clips that may be made available before content roles out of the MVPD system 104a. The packager 130 may also be configured to provide near-real time redundancy. The resulting converted output, i.e. one or more VOD content assets, that is generated by the packager 130 may be communicated to the legacy VOD server which may be communicatively coupled with the plurality of consumer devices 108a, ..., 108n. The packager 130 may also support a robust interface (e.g. ADI) that defines the on-demand duration of the individual segments as well as encryption requirements and a service type to link for ad insertion.

The network 132 may be any kind of network, or a combination of various networks, and it is shown illustrating the communication that may occur between the broadcast provider system 102, the plurality of published data sources 106a, ..., 106n, the plurality of MVPD systems 104a, ..., 104n, the plurality of consumer devices 108a, ..., 108n, and the plurality of advertiser order generation systems 110a, ..., 110n. For example, the network 132 may comprise one or more of a cable television network, the Internet, a satellite communication network 132a, a CDN network 132b, a wide area network (WAN), a medium area network (MAN), and a local area network (LAN).

In operation, the live content distribution device 124a provided in the MVPD system 104a may be configured to receive a live video feed, a plurality of triggers, and metadata from a broadcast source, such as the broadcasting apparatus 122 of the broadcast provider system 102, over a communication network, such as the network 132. The receiver 126 in the live content distribution devices 124a may receive the live video feed from the broadcast provider system 102, via the network 132. Similarly, the plurality of live content distribution devices 124a, ..., 124n in the plurality of MVPD systems 104a, ..., 104n may be configured to receive the live video feed and the plurality of triggers as SCTE-35 message from the broadcast provider system 102, over the network 132. For brevity, the functionality of only one live content distribution device, such as the live content distribution device 124a is explained hereinafter. Notwithstanding, the functionality of the remaining ones of the plurality of live content distribution devices 124b, ..., 124n is similar to the functionality of the live content distribution devices 124a, without any deviation from the scope of the disclosure.

In accordance with an embodiment, a transcoder associated with the receiver 126 may transcode the format of the received live video feed into another format compatible with the MVPD system 104a. The receiver 126 may communicate such live video stream to the segmentation system 128. The segmentation system 128 may determine a plurality of segments (or chunks) in the received live video feed based on the received plurality of triggers and metadata. The segmentation system 128 may be further configured to store the plurality of segments (or chunks) at a storage space provided in the live content distribution device 124a. In accordance with various embodiments, the plurality of segments and the associated metadata may be stored in the storage space in accordance with various versions, such as "C3", "C7", or "Cx", as specified in the playout schedule.

In accordance with an embodiment, one or more of the plurality of segments may be directly provided from the storage space to one or more active video servers. The one or more active video servers may playout the received content to one or more of the plurality of consumer devices 108a, ..., 108n. In accordance with another embodiment, the plurality of segments may be further transcoded into another format, for example, MPEG2 TS, and after applying Nielsen markers, the resulting transport stream may be provided to the packager 130. The packager 130 may generate an ADI package that includes content and associated metadata. The content may correspond to one or more of the plurality of segments transcoded to MPEG2 TS and marked with Nielson markers. The metadata may be standardized by various known standards, such as CableLabs®. Based on such an ADI package, the live content distribution device 124a may dynamically generate one or more VOD content assets for playout to one or more servers, i.e. one or more legacy VOD servers, communicatively coupled with the corresponding MVPD system 104a. The one or more legacy VOD servers may further playout the received content to one or more of the plurality of consumer devices 108a, ..., 108n. An example of the generation of the one or more VOD content assets is shown and described, in FIGS. 1B, 1C, 2, and 3.

In accordance with an exemplary aspect of the disclosure, the traffic and scheduler system 112 may be configured to define a playout schedule of a channel. The playout schedule of a channel defines media content that should be scheduled, the ordering of the media content during playout, and when to deliver content. The content that is delivered may include both the programming content, such as TV programs, and the non-programming content, such as advertisements or promotional media. In accordance with an embodiment, the playout schedule may be a text file or an XML file, that comprise a reference mapping of different media content items. The playout schedule may correspond to the linear video feed of the channel to be broadcasted to the plurality of MVPD systems 104a, ..., 104n. The automation system 116 may receive the playout schedule of the channel from the traffic and scheduler system 112 and further query the content storage 140 to provide required programming data and the plurality of advertisements and/or a promotional media based on the playout schedule. The automation system 116 may provide the programming data and the plurality of advertisements and/or a promotional content that are included in the linear video feed to the television playout system 118 to prepare a playout of a channel (such as a television channel). The television playout system 118 may adjust a plurality of spots in the linear video feed of the channel to maintain the playout schedule. Further, the television playout system 118 may deliver a playout of the linear video feed to broadcast chain elements, such as graphics, closed captions, Nielson markers, format definition data, vertical interval time codes (VITC) and the like.

The trigger inserter 120 may further insert the plurality of SCTE 104 cues or triggers in the linear video feed. Thereafter, such linear video feed with inserted plurality of triggers may be encoded by varying bitrates and the SCTE-104-based digital commercial-marker is converted to SCTE-35-based digital commercial-marker. In accordance with an embodiment, the encoded linear video feed may be multiplexed with SCTE-224 message from LMDB 114 and broadcasted (or stored), via the network 132, such as the satellite communication network 132a, to the plurality of MVPD systems 104a, . . . , 104n for subsequent playout. In such a case, the SCTE-224 message may be embedded in the encoded video feed by a data embedding system (shown in FIG. 1B) during the multiplexing. In accordance with another embodiment, the metadata may be communicated out-of-band separate from the linear video feed and the plurality of triggers and communicated, via the network 132, such as CDN network 132b (shown in FIG. 1B) to the plurality of MVPD systems 104a, . . . , 104n. In such a case, the LMDB 114 separately communicates SCTE-224 (originally DVS1179) message as out-of-band metadata to the plurality of MVPD systems 104a, . . . , 104n via the CDN network 132b.

In accordance with another aspect of the disclosure, the traffic and scheduler system 112 may be configured to receive a specific playout schedule, which corresponds to the linear video feed of the channel broadcasted to the plurality of MVPD systems 104a, . . . , 104n, from a specific source device, such as D4 schedule source. In such a case, the broadcast provider system 102 may generate the new channel comprising one or more VOD content assets, based on the one or more scheduling rules of the specific playout schedule, to be transmitted to the plurality of MVPD systems 104a, . . . , 104n at the time specified in the received specific playout schedule. For example, the new channel, such as "D4 Channel" may be generated on day "4" of the broadcasted linear video feed of the channel in accordance when the version of the previously delivered VOD content assets is "C3".

The specific playout schedule may include one or more scheduling rules that correspond to the linear video feed of a channel broadcasted to the plurality of MVPD systems 104a, . . . , 104n. A first scheduling rule may correspond to sanitization of the received linear video feed of the channel by removal of a lower third graphical content overlay from the linear video feed for the generation of the new channel. A second scheduling rule may correspond to insertion of a discontinuity between program segments to allow DAI within the program segments of the linear video feed for the new channel. In an example, the discontinuity may be a gap between a TV program and various interstitial content items, such as advertisements. In another example, the discontinuity may be a fade-to-black change or insertion of one or more frames of an intermediate brightness level. In yet another example, the discontinuity may be a transition between standard dynamic range (SDR)-HLG or HLG-PQ or HLG- to Prime, and so on.

A third scheduling rule may correspond to insertion of a unique source identifier/time in content in the linear video feed for the new channel. A fourth scheduling rule may correspond to insertion of new promotional content items, specific to the broadcast provider system 102 of the linear video feed, along with VOD content assets for the new channel. The specific playout schedule may further include a time at which the new channel may be generated and broadcasted to the plurality of MVPD systems 104a, . . . , 104n.

The traffic and scheduler system 112 may be further configured to receive cleared and/or modified advertisement orders, queue them, and determine placements of a plurality of advertisements in the linear video feed. The traffic and scheduler system 112 may transmit the playout schedule of the channel to the automation system 116. The automation system 116 may further query the content storage to provide required the programming data and the plurality of advertisements and/or promotional content based on the specific playout schedule.

The automation system 116, in conjunction with one or more components, may sanitize the received linear video feed of the channel by removal of a lower third graphical content overlay from the linear video feed for the generation of the new channel. Further, the automation system 116, in conjunction with one or more components, may insert a discontinuity between program segments to allow DAI within the program segments of the linear video feed for the new channel. Further, the automation system 116, in conjunction with one or more components, may insert a unique source identifier/time in content in the linear video feed for the new channel. Further, the automation system 116, in conjunction with one or more components, may insert new promotional content items, specific to the broadcast provider system 102 of the linear video feed, along with VOD content assets for the new channel.

Figure 1C:
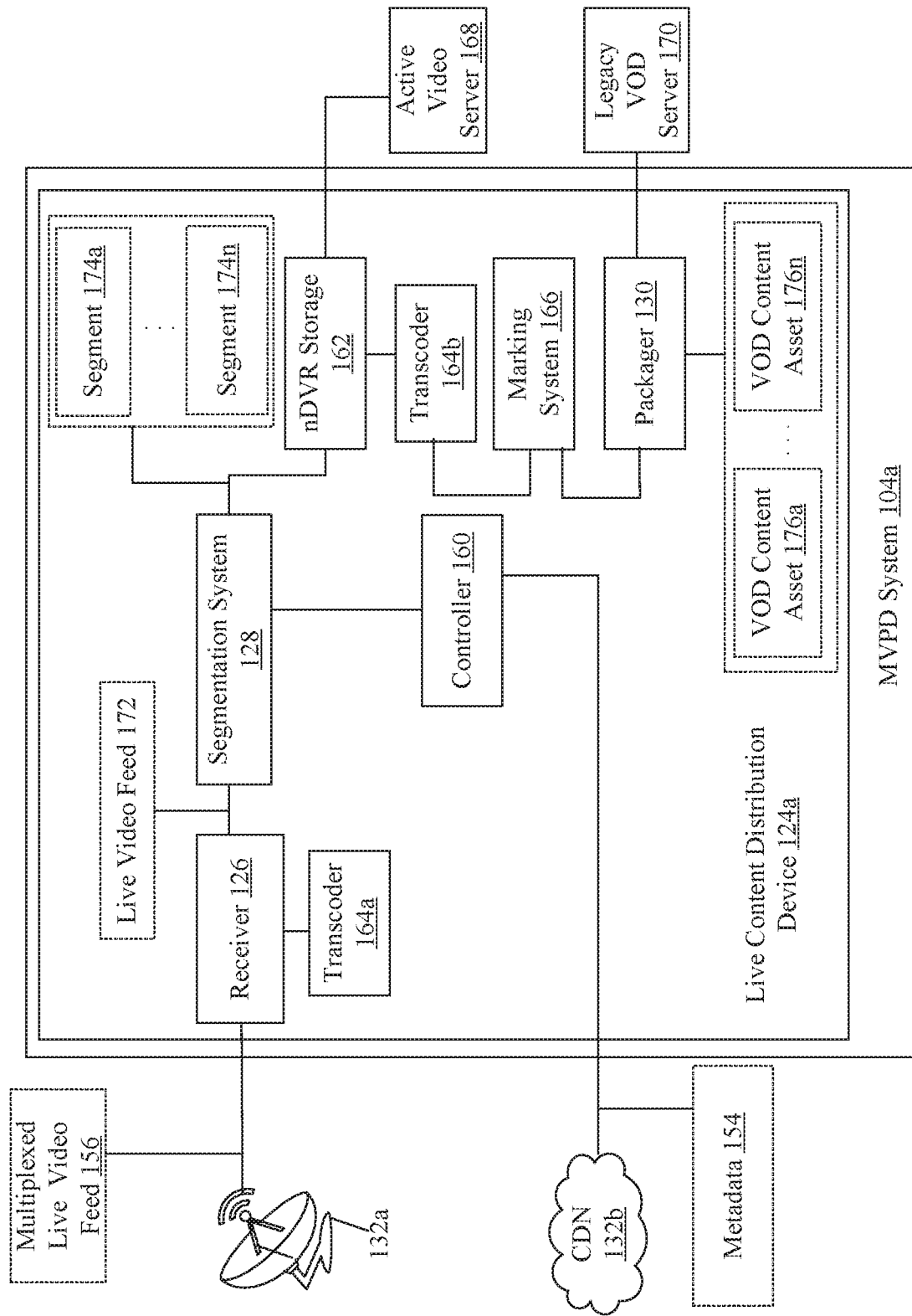
FIG. 1C is a block diagram that illustrates an exemplary live content distribution device in an exemplary MVPD system for dynamically generating one or more VOD content assets for playout, in accordance with an exemplary embodiment of the disclosure.

The television playout system 118 may playout the generated new channel. The trigger inserter 120 may insert the plurality of SCTE 104 cues or triggers in the linear video feed of the new channel received from the television playout system 118. Thereafter, the new channel may be encoded by varying bitrates and convert the SCTE-104-based digital commercial-marker to SCTE-35-based digital commercial-marker. The encoded new channel may be multiplexed with SCTE-224 message from LMDB 114 and communicated (or stored), via the network 132 (such as the satellite communication network 132a as shown in FIG. 1B), to the plurality of MVPD systems 104a, . . . , 104n for subsequent playout. In accordance with another embodiment, the metadata, as SCTE-224 message, may be communicated out-of-band separately from the new channel and the plurality of triggers. In accordance with another embodiment, the encoded new channel that includes the plurality of triggers may be communicated (or stored), via the network 132 (such as the satellite communication network 132a as shown in FIGS. 1B and 1C), to the plurality of MVPD systems 104a, . . . , 104n for subsequent playout. In such a case, the LMDB 114 separately communicates SCTE-224 message as out-of-band metadata to the plurality of MVPD systems 104a, . . . , 104n via another example of the network 132 (such as CDN network 132b of FIG. 1B).

FIG. 1B is a block diagram that illustrates an exemplary broadcast provider system for broadcasting encoded video feed of a channel to a plurality of MVPDs and generating a new channel comprising one or more VOD content assets, in accordance with an exemplary embodiment of the disclosure. The block diagram further illustrates the exemplary broadcast provider system for generating a new channel comprising one or more VOD content assets, in accordance with another exemplary embodiment of the disclosure. Referring to FIG. 1B, there are shown the traffic and scheduler system 112, the LMDB 114, the automation system 116, the television playout system 118, the trigger inserter 120, and the broadcasting apparatus 122, as described in FIG. 1A. The traffic and scheduler system 112 may be shown to be an integrated system that includes a traffic system 112a and a scheduler 112b. There are further shown a source device 133, one or more encoders 134a, . . . , 134n communicatively coupled with the trigger inserter 120 and a multiplexer (MUX) 136 in the broadcast provider system 102. The MUX 136 is further communicatively coupled with the broadcasting apparatus 122 and a data embedding system 138. There is further shown a content storage 140 communicatively coupled to the automation system 116 and the television playout system 118. There is also shown a playout schedule 142, a specific playout schedule 144, a plurality of advertisements and/or promotional content 146, a linear video feed 148, a linear video feed with triggers 150, an encoded linear video feed with triggers 152, metadata 154, a multiplexed live video feed 156, and a new channel 158.

In some embodiments of the disclosure, the television playout system 118 and the trigger inserter 120, may be integrated to form an integrated system. In some embodiments of the disclosure, the automation system 116 may be integrated with the television playout system 118, the trigger inserter 120, the one or more encoders 134a, . . . , 134n, the MUX 136, and the data embedding system 138, to form an integrated system. In some embodiments of the disclosure, the television playout system 118, the automation system 116, the trigger inserter 120, the one or more encoders 134a, . . . , 134n, the MUX 136, and the data embedding system 138, may be located separately, as shown. The functions and/or operations performed by the broadcast provider system 102, and its various components, are further described, in FIGS. 1B, 2A, 3A, and 4. Other separation and/or combination of the various entities of the exemplary broadcast provider system 102 illustrated in FIG. 1B may be done without departing from the spirit and scope of the various embodiments of the disclosure.

The traffic system 112a may comprise suitable logic, circuitry, and interfaces that may be configured to execute code that receives linear video feed 148 (also referred to as a network television live feed) from the source device 133. The received linear video feed 148 may correspond to a channel, such as CNN channel, that is to be broadcasted to the plurality of MVPD systems 104a, . . . , 104n, via the network 132. In accordance with an exemplary expect of the disclosure, the traffic system 112a may receive a specific playout schedule, such as a D4 schedule for a D4 channel, from a source device, such as the source device 133. The specific playout schedule is represented as the specific playout schedule 144 in FIG. 1B.

The scheduler 112b may comprise suitable logic, circuitry, and interfaces that may be configured to execute code that handles a programming schedule of a channel. The programming schedule of a channel defines what media content should be scheduled, the ordering of the media content during playout, and when to deliver content. The content that is delivered may include both the programming content, such as TV programs, and the non-programming content, such as advertisements or promotional media. In accordance with an embodiment, the programming schedule may be a text file or an XML file, which comprises a reference mapping of different media content items that need to be stitched by a stitcher (not shown). The scheduler 112b may modify existing programming schedule to generate a new programming schedule, where the generation of the new programming schedule may enable creation of new channels.

The one or more encoders 134a, . . . , 134n may comprise suitable logic, circuitry, and interfaces that may be configured to execute code that may be configured to receive the linear video feed with triggers 150 (as SCTE-104-inserted message) from the trigger inserter 120. The one or more encoders 134a, . . . , 134n may encode the SCTE-104 message and convert the SCTE-104 message to SCTE-35 message. The one or more encoders 134a, . . . , 134n may encode the linear video feed with triggers 150 by varying bitrates. An example of such one or more encoders 134a, . . . , 134n may be Mezzanine encoder, known in the art.

The MUX 136 may comprise suitable logic, circuitry, and interfaces that may be configured to execute code that may receive the encoded linear video feed with triggers 152 (as SCTE-35-based message) and multiplex with live metadata 154 related to the encoded linear video feed with triggers 152, which is received from the LMDB 114, in conjunction with the data embedding system 138. Thus, the MUX 136 may facilitate the broadcasting of the metadata 154 (as SCTE-224 message) along with the encoded linear video feed with triggers 152 (as SCTE-35 message) in one or more configurations. In accordance with a first configuration, the metadata 154 is broadcasted in-band with the encoded linear video feed with triggers 150, via the satellite communication network 132a. In accordance with a second configuration, the metadata 154 is broadcasted out-of-band separate from the encoded linear video feed with triggers 150, via the CDN network 132b.

The data embedding system 138 may comprise suitable logic, circuitry, and interfaces that may be configured to execute code that may receive the live metadata 154 from the LMDB 114 and transmit it to the MUX 136 where the live metadata 154 is multiplexed with the encoded linear video feed with triggers 152. Accordingly, the live metadata 154 is broadcasted in-band with the encoded linear video feed with triggers 152.

The content storage 140 may comprise suitable logic, circuitry, and interfaces that may be configured to execute code that may receive requests from the automation system 116 for required additional content in accordance with the playout schedule 142. Further, the content storage 140 may provide such additional content to the television playout system 118 also in real-time.

The playout schedule 142 may correspond to a schedule pertaining to a playout of the programming data and the plurality of advertisements and/or promotional content 146. The playout schedule 142 may also be referred to as a programming schedule. The playout schedule 142 may include an ordering of the programming data and the plurality of advertisements and/or promotional content 146. During the playout, the programming data and the plurality of advertisements and/or promotional content 146 are played out in the corresponding order as specified in the playout schedule 142. The scheduler 112b may be configured to generate the playout schedule 142. In accordance with an embodiment, the playout schedule 142 may include information, such as after a series episode airs live, if a viewer watches the same set of commercials in an episode within 3 days, the network provider, gets Nielsen "C3" credit.

The specific playout schedule 144 may be received from a specific source device 133, such as "D4 schedule source," based on which the new channel 158 may be generated. The specific playout schedule 144 may include one or more scheduling rules that correspond to the linear video feed 148 of a channel broadcasted to the plurality of MVPD systems 104a, . . . , 104n. A first exemplary scheduling rule may correspond to sanitization of the received linear video feed 148 of the channel by removal of a lower third graphical content overlay from the linear video feed 148 for the generation of the new channel 158. A second exemplary scheduling rule may correspond to insertion of a discontinuity between program segments to allow dynamic advertisement insertion (DAI) within the program segments of the linear video feed 148 for the new channel 158. A third exemplary scheduling rule may correspond to insertion of a unique source identifier/time in content in the linear video feed 148 for the new channel 158. A fourth exemplary scheduling rule may correspond to insertion of new promotional content items, specific to the broadcast provider system 102 of the linear video feed 148, along with VOD content assets for the new channel 158. The specific playout schedule 144 may further include a time at which the new channel 158 may be generated and broadcasted to the plurality of MVPD systems 104a, . . . , 104n.

The programing data and the plurality of advertisements and/or promotional content 146 may correspond to the content received form the plurality of advertiser order generation systems 110a, . . . , 110n based on which the playout schedule 142 is dynamically updated by the scheduler 112b. The programing data may include a plurality of program segments of main program content, such as TV shows, TV programs, Live content, and/or VOD content, separated by one or more commercial breaks. The plurality of advertisements and/or promotional content 146 may correspond to media items that are to be inserted at the plurality of spots or inventory buckets related to the one or more commercial breaks in the linear video feed 148.

The linear video feed 148 may correspond to a linear stream of multimedia frames of programming data provided by a content source. The linear video feed 148 may correspond to an uncompressed SDI video and may be embedded with the ancillary data, such as the close caption data, format definition data, VITC, and/or the like in the broadcast chain during playout by the television playout system 118.

The linear video feed with triggers 150 may correspond to the uncompressed SDI video that is inserted with the plurality of triggers by the trigger inserter 120 and may correspond to SCTE-104-inserted message. The SCTE-104-based digital ad-marker may be inserted in the SDI video as vertical ancillary (VANC) data. The SCTE-104 is in 10-bit hexadecimal format so as to match data words in the uncompressed SDI video.

The encoded linear video feed with triggers 152 may correspond to the uncompressed SDI video that is inserted with the plurality of triggers and may correspond to SCTE-104 message. SCTE-104-based digital ad-marker may be inserted in the SDI video as vertical ancillary (VANC) data. The SCTE-104 is in 10-bit hexadecimal format so as to match data words in the uncompressed SDI video corresponding to the linear video feed 148.

The metadata 154 may correspond to information related to the programing data stored in the LMDB 114. The metadata 154 may be based on first and second information received by the LMDB 114 from the traffic and scheduler system 112 and the automation system 116, respectively. The first information received from the traffic and scheduler system 112 may be associated with the playout schedule 142 or the specific playout schedule 144. The second information received from the automation system 116 may be associated with an updated playout schedule or an updated specific playout schedule. In accordance with an embodiment, the metadata 154 may be distributed by the LMDB 114 to the plurality of MVPD systems 104a, . . . , 104n or external affiliates for individual networks via SCTE-224 message separately through separate CDN network 132b. In accordance with an embodiment, the metadata 154 may be distributed by the LMDB 114 to the plurality of MVPD systems 104a, . . . , 104n or external affiliates as in-band data in the multiplexed live video feed 156, via the satellite communication network 132a. In accordance with an embodiment, the metadata 154 may be distributed by the LMDB 114 to the plurality of MVPD systems 104a, . . . , 104n or external affiliates as out-of-band data separate from the multiplexed live video feed 156, via the CDN network 132b. Examples of the metadata 154 may include item identifiers in the linear video feed 148, titles, file formats, encryption information, timing information associated with one or more commercial breaks, a playout schedule to play the one or more advertisements and/or promotional content 146 within programming data of the linear video feed 148, and signaling content of the linear video feed 148.

The multiplexed live video feed 156 may correspond to the encoded linear video feed with triggers 152 (SCTE 104 message) received from the one or more encoders 134a, . . . , 134n multiplexed with the metadata 154 received from the data embedding system 138. In accordance with an embodiment, the broadcasting apparatus 122 transmits channels corresponding to the multiplexed live video feed 156 as unencrypted and are therefore free-to-air or free-to-view. In accordance with another embodiment, the broadcasting apparatus 122 transmits channels with encryption (pay television), and thus requiring a subscription by the plurality of consumer devices 108a, . . . , 108n via the plurality of MVPD systems 104a, . . . , 104n. In such a case, the encryption may be based on CA or DRM technology, known in the art.

In accordance with an embodiment, the new channel 158, such as a D4 channel, may be generated by the broadcast provider system 102 based on the one or more scheduling rules of the specific playout schedule 144 (i.e. D4 schedule). The new channel 158 thus generated may include one or more VOD content assets that may be transmitted to the plurality of MVPD systems 104a, . . . , 104n via a different communication medium of the network at the time specified in the specific playout schedule 144. In accordance with an embodiment, based on the "C3" content, an integrated system comprising the television playout system 118, the trigger inserter 120, and the one or more encoders 134a, . . . , 134n in the broadcast provider system 102 may be configured to generate the new channel 158, "D4 channel," which may be broadcasted on day "4" of the originally aired live video feed, i.e. the multiplexed live video feed 156.

FIG. 1C is a block diagram that illustrates an exemplary MVPD system for dynamically generating one or more VOD content assets for playout, in accordance with an exemplary embodiment of the disclosure. Referring to FIG. 1C, there is shown an MVPD system 104a of the plurality of MVPD systems 104a, . . . , 104n for brevity. Notwithstanding, it may be understood that the functionality of the remaining MVPD systems of the plurality of MVPD systems 104a, . . . , 104n is similar to the functionality of the MVPD system 104a (described in FIG. 1A), without any deviation from the scope of the disclosure. There are shown a live content distribution device 124a in the MVPD system 104a. The live content distribution device 124a may be provided in an MVPD headend of the MVPD system 104a associated with an affiliate. There is further shown the receiver 126, the segmentation system 128, and the packager 130. There is further shown a controller 160, a network DVR (nDVR) storage 162, one or more transcoders, such as a transcoder 164b, and a marking system 166 in the live content distribution device 124a. There is further shown two servers, an active video server 168 and a legacy VOD server 170 communicatively coupled to the live content distribution device 124a. The active video server 168 and the legacy VOD server 170 may be further communicatively coupled to the plurality of consumer devices 108a, . . . , 108n (FIG. 1A). There is further shown the multiplexed live video feed 156 received from the broadcast provider system 102. A live video feed 172, a plurality of segments 174a, . . . , 174n, and one or more VOD content assets 176a, . . . , 176n, are also shown.

The controller 160 may comprise suitable logic, circuitry, and interfaces that may be operable to execute code that may be configured to receive the SCTE-224-based message from the LMDB 114, via the CDN network 132b, to control the segmentation system 128. The controller 160 may be configured to control the segmentation system 128 for the generation of the plurality of segments 174a, . . . , 174n based on the metadata 154 and the plurality of triggers in the received multiplexed live video feed 156. In accordance with an embodiment, the controller 160 may not be required when the receiver 126 receives the SCTE-224 message corresponding to the metadata 154, in-band with the SCTE-35-based message in the multiplexed live video feed 156.

The nDVR storage 162 may comprise suitable logic, circuitry, and interfaces that may be operable to execute code that may be configured to capture, for example, raw MPEG-2 TS of the plurality of segments 174a, . . . , 174n and associated metadata 154. The MPEG-2 TS may comprise adaptive transport stream (ATS) metadata comprising encoding boundary points (EBP) and may act as a source for both live and on demand packaging. In an exemplary embodiment, the nDVR storage 162 may be configured to store approximately 75 hours of content. However, the capacity of the nDVR storage 162 may be increased based on enhanced hardware memory storage devices utilized to realize the nDVR storage 162, without deviation from the scope of the disclosure.

The nDVR storage 162 may store the plurality of segments 174a, . . . , 174n generated from the live video feed 172 by the segmentation system 128. The nDVR storage 162 may be further configured to store the metadata 154, associated with the plurality of segments 174a, . . . , 174n, received through the controller 160. In accordance with an embodiment, the plurality of segments 174a, . . . , 174n and the associated metadata 154 may be stored in the nDVR storage 162 in accordance with various versions, such as "C3", "C7", or "Cx". In accordance with an embodiment, the stored plurality of segments 174a, . . . , 174n may be directly retrieved from the nDVR storage 162 by the active video server 168 for playout. In accordance with an embodiment, the stored plurality of segments 174a, . . . , 174n may be retrieved from the nDVR storage 162 by the one or more transcoders 164a and 164b and the marking system 166 for the packager 130 that generates the one or more VOD assets 176a, . . . , 176n for the legacy VOD server 170.

The one or more transcoders, such as the transcoders 164a and 164b, in the live content distribution device 124a may comprise suitable logic, circuitry, and interfaces that may be configured to execute code to decode a video feed from one format to an uncompressed format, and then re-encoding the uncompressed video feed to the desired digital format. In an example, a transcoder, such as the transcoder 164a, of the one or more transcoders may be communicatively coupled with the receiver 126. In another example, a transcoder, such as the transcoder 164b, of the one or more transcoders may be communicatively coupled with the marking system 166.

The marking system 166 may comprise suitable logic, circuitry, and interfaces that may be operable to execute code that may be configured to introduce watermarks in the plurality of segments 174a, . . . , 174n received from the transcoder 164b. In accordance with an embodiment, the marking system 166 may introduce the watermarks, such as Nielsen source identifier (SID)/time in content (TIC), in the plurality of segments 174a, . . . , 174n based on Nielsen VOD content encoding application, known in the art. The marking system 166 may further communicate the watermarked plurality of segments 174a, . . . , 174n (as watermarked MPEG-2 TS segments) to the packager 130.

The active video server 168 may comprise suitable logic, circuitry, and interfaces that may be operable to execute code that may be configured to receive live video origin content that may be output from the nDVR storage 162. In this regard, the live video origin content may correspond to various hypertext transfer protocol (HTTP) formats such as HLS, protected HLS, Smooth Streaming, and dynamic adaptive streaming over HTTP (Dash).

The legacy VOD server 170 may comprise suitable logic, circuitry, and interfaces that may be operable to execute code that may be configured to receive one or more VOD content assets from the packager 130. Although already encoded content may be extracted from the legacy VOD server 170, there may be use cases and examples where rules for one or more advertisements and/or promotional content change between live and the "C3" window, DRM license rights change from 24 hours to 75 hours, Nielsen ID3 tags change from the live tags to VOD tags, and encryption rules may change in order to extract clips or segments to share that do not require any encryption or DRM protection. Leveraging access to the incoming MPEG-2 TS via the packager 130 enables the creation of such kinds of on-demand content. The packager 130 may enable the creation of multiple VOD content assets with different properties—DRM enabled version of content, no DRM enabled version of content, encrypted version of content, non-encrypted (clear) version of content.

The live video feed 172 may be received from the receiver 126 communicatively coupled with the transcoder 164a. The live video feed 172 may correspond to a demultiplexed stream, from which the CA or DRM encryption is removed by the receiver 126. The format of the live video feed 172 may be, for example, MPEG-2 TS (MPTS), compatible with the MVPD system 104a, which may be converted by the transcoder 164a from the format of the multiplexed live video feed 156, which may be the MPTS. The transcoded live video feed 172 may be provided to the segmentation system 128.

Each of the plurality of segments 174a, . . . , 174n may correspond to a chunk of the transcoded live video feed 172 which is generated based on the plurality of triggers in the SCTE-35 message and metadata in the SCTE-224-based message in the live video feed 172. The format of each of the plurality of segments 174a, . . . , 174n may correspond to an MPEG-2 TS that may comprise ATS metadata comprising EBP and may act as a source for both live and on demand packaging.

Each of the one or more VOD content assets 176a, . . . , 176n may correspond to a unit of media content that includes media content (audio and video content). Examples of the one or more VOD content assets 176a, . . . , 176n may include, but are not limited to, movies, television programs, news programs, advertisements, video clips, audio (e.g., radio) programs, audio clips, and trick files. The one or more VOD content assets 176a, . . . , 176n may include recorded live content (e.g., a live sports game) and/or pre-recorded content, or pre-scheduled broadcast content. The one or more VOD content assets 176a, . . . , 176n may also include metadata that is descriptive of the VOD content asset and/or the content therein. Examples of such metadata may include or otherwise indicate description of content, date or date range, time length of the content, data size of the content, format of the content, bit rate of the content, and the like of each of the one or more VOD content assets 176a, . . . , 176n.

Figure 2:
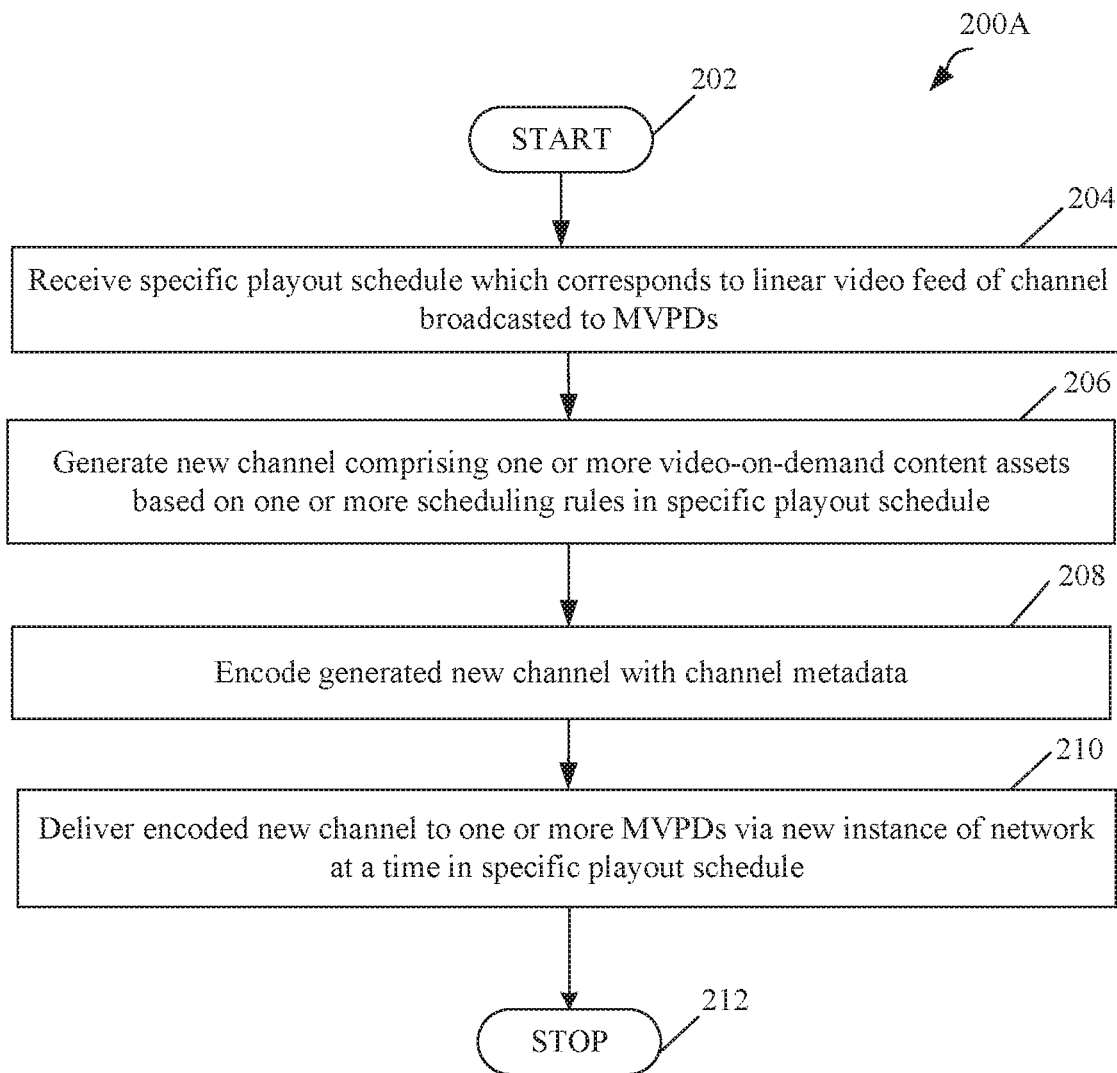
FIG. 2 depicts a flow chart illustrating high-level operation of an exemplary broadcast provider system of FIG. 1B, in accordance with an exemplary embodiment of the disclosure.

FIG. 2 depicts a flow chart illustrating high-level operation of an exemplary broadcast provider system of FIG. 1B, in accordance with an exemplary embodiment of the disclosure. Referring to FIG. 2, there is shown a flow chart 200 comprising exemplary operations 202 through 210. The exemplary operations may start at 202 and proceed to 204.

At 204, a specific playout schedule, which corresponds to a linear video feed of a channel broadcasted to the plurality of MVPD systems 104a, . . . , 104n, may be received from a D4 schedule source (referred to as the source device 133). The traffic and scheduler system 112 may be configured to receive the specific playout schedule 144, which corresponds to the linear video feed 148 of the channel broadcasted to the plurality of MVPD systems 104a, . . . , 104n, from the D4 schedule source. The specific playout schedule 144 may include one or more scheduling rules that correspond to the linear video feed 148 of the channel broadcasted to the plurality of MVPD systems 104a, . . . , 104n. For example, a first scheduling rule of the one or more scheduling rules in the specific playout schedule 144 may correspond to a sanitization of the received linear video feed 148 of the channel. A second scheduling rule of the one or more scheduling rules may correspond to an insertion of a discontinuity between program segments in the linear video feed 148. A third scheduling rule of the one or more scheduling rules may correspond to an insertion of a unique source identifier/time in content in the linear video feed 148. A fourth scheduling rule of the one or more scheduling rules may correspond to an insertion of new promotional content items, specific to the broadcast provider system 102 in the linear video feed 148, along with VOD content assets. The specific playout schedule 144 may further include a time as which to deliver content. The one or more scheduling rules and the time in the specific playout schedule 144 may be utilized for generation of a new channel, i.e. the new channel 158, which corresponds to the linear video feed 148.

At 206, the new channel 158 comprising one or more VOD content assets may be generated by the automation system 116, based on the one or more scheduling rules of the specific playout schedule 144, to be transmitted to the plurality of MVPD systems 104a, . . . , 104n at a time specified in the received specific playout schedule 144. The automation system 116 may be configured to sanitize the received linear video feed 148 of the channel for the generation of the new channel 158, based on the first scheduling rule of the one or more scheduling rules in the specific playout schedule 144. The automation system 116 may sanitize the received linear video feed 148 by removing a lower third graphical content overlay from the received linear video feed 148. The automation system 116 may be further configured to insert a discontinuity between program segments in the received linear video feed 148 for the generation of the new channel 158, based on the second scheduling rule. The automation system 116 may insert the discontinuity between the program segments in the received linear video feed 148 to allow DAI within the program segments of the linear video feed 148. The automation system 116 may be configured to insert a unique identifier, such as Nielson SID/TIC, in the linear video feed 148 for the generation of the new channel 158, based on the third scheduling rule. The SID corresponds to source identification that uniquely identifies the broadcast provider system 102. The TIC corresponds to time in content which is a serial number that is watermarked onto VOD content every four seconds to uniquely identify the program. The automation system 116 may be further configured to insert new promotional content items (such as advertisements) along with VOD content assets in the linear video feed 148 for the generation of the new channel 158, based on the fourth scheduling rule. The inserted new promotional content items may be specific to a content provider associated with the source of the linear video feed 148.

At 208, the generated new channel 158 may be encoded and thereafter multiplexed with channel metadata, i.e. metadata 154, as SCTE-224 message. The SCTE-224 message may be received from the LMDB 114. The plurality of encoders 134a, . . . , 134n may be configured to encode the generated new channel 158. The MUX 136 may be configured to multiplex the metadata 154 received as SCTE-224 message in to the encoded new channel 158. The metadata 154 may include digital rights associated with the linear video feed 148, timing information associated with one or more commercial breaks, a program schedule based on which the one or more advertisements within one or more program segments of the linear video feed 148, and signaling content of the linear video feed 148. In an embodiment, if the metadata 154 is not embedded with the generated new channel 158, the LMDB 114 may be configured to communicate the metadata 154 separately to the plurality of MVPD systems 104a, . . . , 104n via another example of the network 132, such as CDN network 132b.

At 210, the encoded new channel 158 may be delivered to the plurality of MVPD systems 104a, . . . , 104n via a new communication medium of the network 132 at the time specified in the received specific playout schedule 144. Control passes to end step 212.

Figure 3:
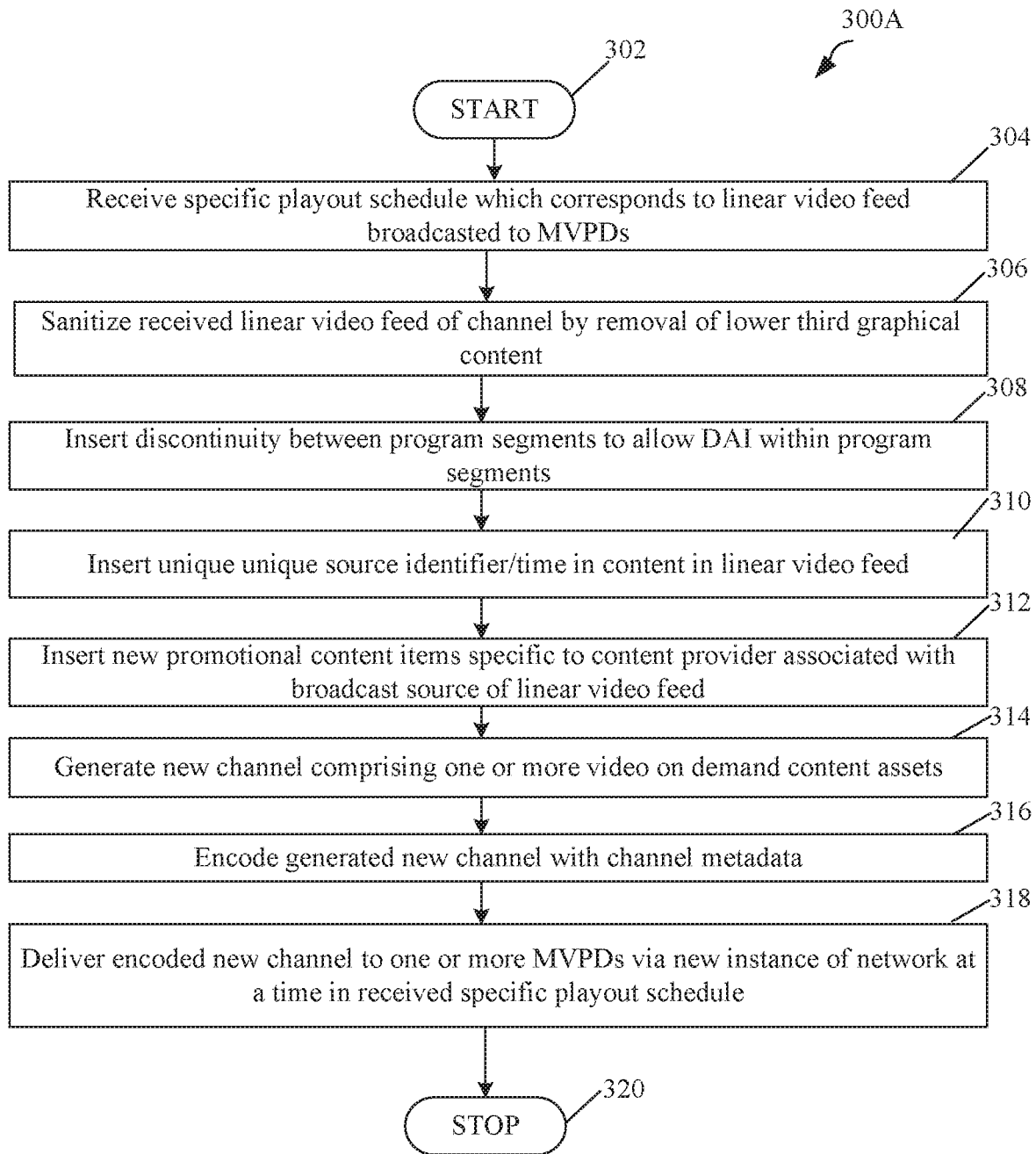
FIG. 3 depicts a flow chart illustrating exemplary operations for dynamically generating VOD assets for MVPDs, in accordance with an exemplary embodiment of the disclosure.

FIG. 3 depicts a flow chart illustrating exemplary operations for generating a new channel comprising one or more VOD content assets, in accordance with an exemplary embodiment of the disclosure. Referring to FIG. 3, there is shown a flow chart 300A comprising exemplary operations 302 to 320. The exemplary operations may start at 302 and proceed to 304.

At 304, the traffic and scheduler system 112 may be configured to receive the specific playout schedule 144 from the D4 schedule source. The specific playout schedule 144 corresponds to the linear video feed 148 broadcasted to the MVPDs (such as the plurality of MVPD systems 104a, . . . , 104n).

At 306, the automation system 116 may be configured to sanitize the received linear video feed 148 of the channel by removal of lower third graphical content. The automation system 116 may sanitize the received linear video feed 148 for the generation of the new channel 158 based on the first scheduling rule of the one or more scheduling rules in the specific playout schedule 144 and in association with the television playout system 118.

At 308, the automation system 116 may be configured to insert a discontinuity between the program segments to allow DAI within the program segments. The automation system 116 may insert the discontinuity in the received linear video feed 148 for the generation of the new channel 158, based on the second scheduling rule of the one or more scheduling rules in the specific playout schedule 144 by use of the trigger inserter 120.

At 310, the automation system 116 may be configured to insert the unique identifier/time in content (such as Nielson SID/TIC) in the linear video feed 148. The automation system 116 may insert the unique identifier/time in content for the generation of the new channel 158, based on the third scheduling rule of the one or more scheduling rules in the specific playout schedule 144. The automation system 116 may be configured to insert the unique identifier/time in content in association with the television playout system 118.

At 312, the automation system 116 may be configured to insert the new promotional content items (such as advertisements) specific to the content provider associated with the source of the linear video feed 148. The automation system 116 may insert the new promotional content items for the generation of the new channel 158, based on the fourth scheduling rule of the one or more scheduling rules in the specific playout schedule 144.

At 314, the new channel 158 comprising the one or more VOD content assets may be generated. In accordance with an embodiment, the new channel 158 may be generated by the automation system 116. In such a case, the generated new channel 158 may be played out by the television playout system 118. In accordance with another embodiment, the new channel 158 may be generated by an integrated system of the broadcast provider system 102 based on the one or more scheduling rules of the specific playout schedule 144. The integrated system may comprise the automation system 116, the television playout system 118, and the trigger inserter 120. In accordance with an embodiment, the broadcast provider system 102 may be configured to generate the new channel 158, "D4 channel", which may be broadcasted on day "4" of the aired live video feed, i.e. the multiplexed live video feed 156.

At 316, the plurality of encoders 134*a*, . . . , 134*n* may be configured to encode the generated new channel 158 and convert it into the SCTE-35 message. The SCTE-35 message may correspond to an HD-SDI video interface with a plurality of triggers. In accordance with an embodiment, the encoded new channel 158 may be multiplexed with SCTE-224 message from LMDB 114.

At 318, the encoded new channel 158 may be delivered to the plurality of MVPD systems 104*a*, . . . , 104*n* via a new communication medium of the network 132 at the time specified in the received specific playout schedule 144. Control passes to end 320.

Figure 4:
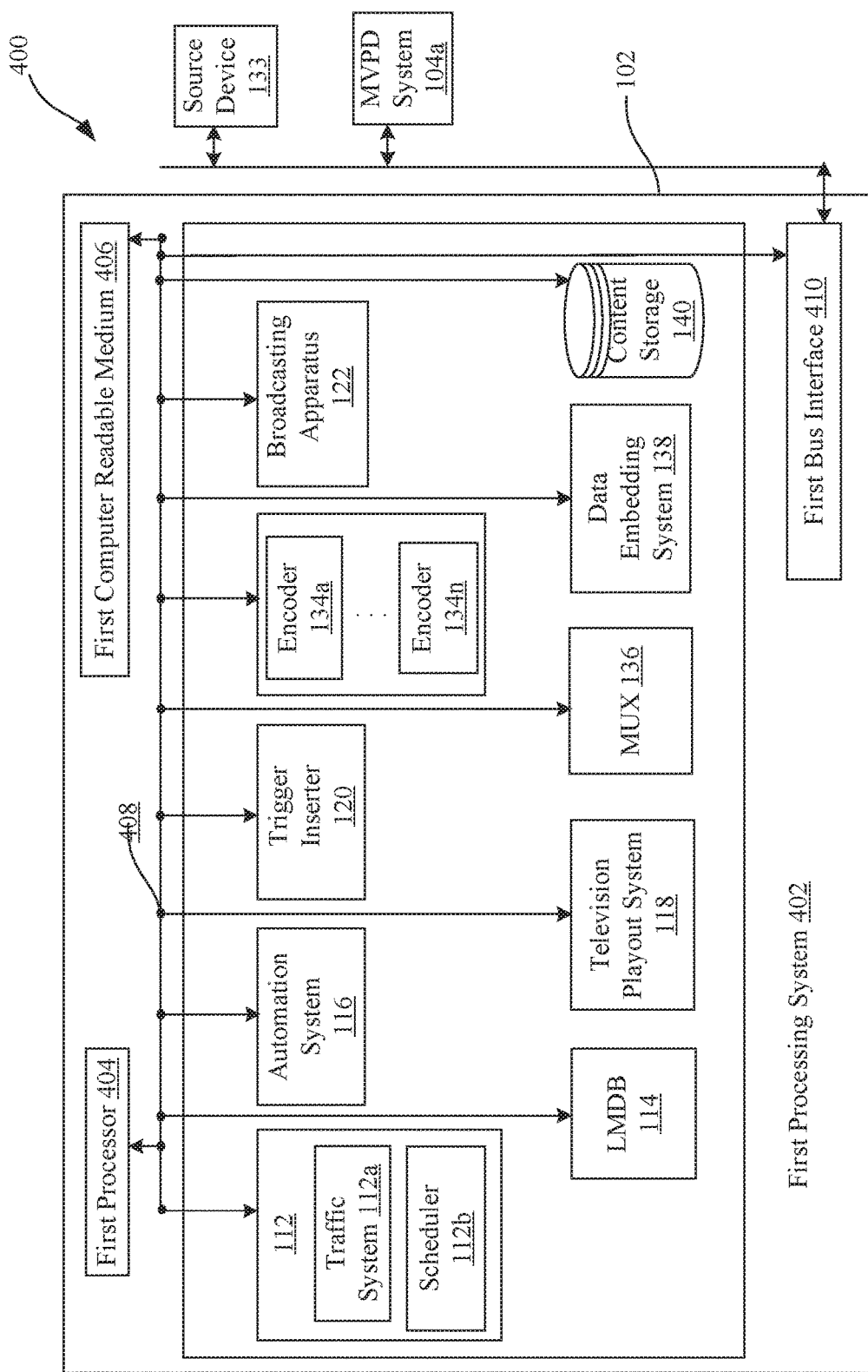
FIG. 4 is a conceptual diagram illustrating an example of a hardware implementation for an exemplary broadcast provider system, in accordance with an exemplary embodiment of the disclosure.

FIG. 4 is a conceptual diagram illustrating an example of a hardware implementation for an exemplary broadcast provider system, in accordance with an exemplary embodiment of the disclosure. Referring to FIG. 4, the hardware implementation shown by a representation 400 for the broadcast provider system 102 employs a processing system 402 for dynamic generation of VOD assets, in accordance with an exemplary embodiment of the disclosure, as described herein. In some examples, the processing system 402 may comprise one or more hardware processors 404, a non-transitory computer-readable medium 406, a hardware traffic and scheduler system 112, a hardware LMDB 114, a hardware automation system 116, a hardware television playout system 118, a hardware trigger inserter 120, and a hardware broadcasting apparatus 122. The traffic and scheduler system 112 may further comprise a hardware traffic system 112*a* and a hardware scheduler 112*b*.

In this example, the broadcast provider system 102 employing the processing system 402 may be implemented with a bus architecture, represented generally by a bus 408. The bus 408 may include any number of interconnecting buses and bridges depending on the specific implementation of the broadcast provider system 102 and the overall design constraints. The bus 408 links together various circuits including the one or more processors, represented generally by the processor 404, the non-transitory computer-readable media, represented generally by the computer-readable medium 406, the hardware traffic and scheduler system 112, the hardware LMDB 114, the hardware automation system 116, the hardware television playout system 118, the hardware trigger inserter 120, and the hardware broadcasting apparatus 122, which may be configured to carry out one or more operations or methods described herein. A bus interface 410 provides an interface between the bus 408 and a transceiver 412. The transceiver 412 provides a means for communicating via the network 132 with various other apparatus, such as the plurality of MVPD systems 104*a*, . . . , 104*n*, the plurality of published data sources 106*a*, . . . , 106*n*, the plurality of consumer devices 108*a*, . . . , 108*n*, and the plurality of advertiser order generation systems 110*a*, . . . , 110*n*.

The processor 404 may be configured to manage the bus 408 and general processing, including the execution of a set of instructions stored on the computer-readable medium 406. The set of instructions, when executed by the processor 404, causes the broadcast provider system 102 to execute the various functions described herein for any particular apparatus. The computer-readable medium 406 may also be used for storing data that is manipulated by the processor 404 when executing the set of instructions. The computer-readable medium 406 may also be configured to store data for one or more of the hardware traffic and scheduler system 112, the hardware LMDB 114, the hardware automation system 116, the hardware television playout system 118, the hardware trigger inserter 120, and the hardware broadcasting apparatus 122.

In an aspect of the disclosure, the processor 404, the computer-readable medium 406, or a combination of both may be configured or otherwise specially programmed to execute the operations or functionality of the hardware traffic and scheduler system 112, the hardware LMDB 114, the hardware automation system 116, the hardware television playout system 118, the hardware trigger inserter 120, and the hardware broadcasting apparatus 122, or various other components described herein. For example, the processor 404, the computer-readable medium 406, or a combination of both may be configured or otherwise specially programmed to perform the operations and functionality of the hardware traffic and scheduler system 112, the hardware LMDB 114, the hardware automation system 116, the hardware television playout system 118, the hardware trigger inserter 120, and the hardware broadcasting apparatus 122 as described with respect to FIGS. 1A, 1B, 1C, 2, 3, and 4.

Various embodiments of the disclosure comprise a broadcast provider system, such as the broadcast provider system 102, which may be configured to generate a new channel, such as the new channel 158. The broadcast provider system 102 may comprise, for example, the traffic and scheduler system 112 and the automation system 116. The traffic and scheduler system 112 may be configured to receive a playout schedule, such as the specific playout schedule 144, which corresponds to the live video feed 172 of a channel broadcasted to the one or more MVPD systems 104a, ..., 104n, from a playout schedule source, such as the source device 133. The automation system 116 may be configured to generate the new channel 158 for the one or more VOD content assets 176a, ..., 176n, based on one or more scheduling rules, such as the first, second, third, and fourth scheduling rules, of the specific playout schedule 144. The new channel 158 may be transmitted to the plurality of MVPDs 104a, ..., 104n at a time specified in the specific playout schedule 144.

Various embodiments of the disclosure may provide a non-transitory computer-readable medium having stored thereon, computer implemented instruction that when executed by a processor causes a broadcast provider system, such as the broadcast provider system 102, to generate a new channel, such as the new channel 158. A playout schedule, such as the specific playout schedule 144, which corresponds to the live video feed 172 of a channel broadcasted to the one or more MVPD systems 104a, ..., 104n, may be received from a playout schedule source, such as the source device 133. The new channel 158 may be generated for the one or more VOD content assets 176a, ..., 176n, based on one or more scheduling rules, such as the first, second, third, and fourth scheduling rules, of the specific playout schedule 144. The new channel 158 may be transmitted to the plurality of MVPDs 104a, ..., 104n at a time specified in the specific playout schedule 144.

Thus, the system 100 enables the broadcast provider system 102 and the plurality of MVPD systems 104a, ..., 104n to operate more efficiently and optimally providing both a cost and economic advantage. The new channel may be more quickly provided and may be communicated on a separate uplink to support legacy VODs that are outfitted or capable of handling modern services and/or features.

The word "exemplary" is used herein to mean "serving as an example, instance, or illustration." Any embodiment described herein as "exemplary" is not necessarily to be construed as preferred or advantageous over other embodiments. Likewise, the term "embodiments of the disclosure" does not require that all embodiments of the disclosure include the discussed feature, advantage or mode of operation.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for creation of channel to support legacy video-on-demand systems.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
one or more processors in a broadcast provider system, wherein the one or more processors are configured to:
receive a playout schedule from a playout schedule source,
wherein the playout schedule corresponds to a live video feed of a first channel, wherein the live video feed is broadcasted to at least one multichannel video program distributor (MVPD),
wherein the playout schedule specifies:
a first time of transmission of a second channel, and at least one scheduling rule, and
wherein the at least one scheduling rule specifies a modification of content in the live video feed of the first channel;
generate the second channel comprising at least a first video on demand (VOD) content asset based on a version of a second VOD content asset,
wherein the second channel is generated based on a sanitization of the live video feed of the first channel,
wherein the live video feed of the first channel is sanitized by removal of a lower third graphical content overlay from the live video feed, and
wherein the second VOD content asset is transmitted to a plurality of MVPDs before transmission of the first VOD content asset to the plurality of MVPDs; and
transmit the second channel to the plurality of MVPDs at the first time specified in the received playout schedule.

2. The system according to claim 1,
wherein the one or more processors are further configured to generate the second channel based on insertion of a discontinuity between program segments, and
wherein the discontinuity comprises dynamic ad insertion (DAI) within the program segments of the live video feed.

3. The system according to claim 1, wherein the one or more processors are further configured to generate the second channel based on insertion of at least one of a unique source identifier or a second time associated with the content in the live video feed.

4. The system according to claim 1,
wherein the one or more processors are further configured to insert promotional content items in the live video feed, and
wherein the promotional content items are specific to a content provider associated with the broadcast provider system of the live video feed.

5. The system according to claim 1, wherein the one or more processors are further configured to encode the generated second channel with channel metadata.

6. The system according to claim 5, wherein the channel metadata includes at least one of digital rights associated with the live video feed, timing information associated with at least one commercial break, a program schedule to play at least one advertisement within at least one program segment of the live video feed, or signaling content of the live video feed.

7. The system according to claim 5,
wherein the one or more processors are further configured to deliver the encoded second channel to the plurality of MVPDs at the first time specified in the received playout schedule, and
wherein the encoded second channel is delivered via a communication medium of a network.

8. A method, comprising:
in a broadcast provider system:
receiving a playout schedule from a playout schedule source,
wherein the playout schedule corresponds to a live video feed of a first channel, wherein the live video feed is broadcasted to at least one multichannel video program distributor (MVPD),
wherein the playout schedule specifies at least one of a first time of transmission of a second channel or at least one scheduling rule, and
wherein the at least one scheduling rule specifies a modification of content in the live video feed of the first channel;
generating the second channel comprising at least a first video on demand (VOD) content asset based on a version of a second VOD content asset,
wherein the second channel is generated based on a sanitization of the live video feed of the first channel,
wherein the live video feed of the first channel is sanitized by removal of a lower third graphical content overlay from the live video feed, and
wherein the second VOD content asset is transmitted to a plurality of MVPDs before transmission of the first VOD content asset to the plurality of MVPDs;
transmitting the second channel to the plurality of MVPDs at the first time specified in the received playout schedule.

9. The method according to claim 8, further comprising generating the second channel based on insertion of a discontinuity between program segments, wherein the discontinuity comprises dynamic ad insertion (DAI) within the program segments of the live video feed.

10. The method according to claim 8, further comprising generating the second channel based on insertion of at least one of a unique source identifier or a second time associated with the content in the live video feed.

11. The method according to claim 8, further comprising generating the second channel based on insertion of promotional content items and the at least one VOD content asset in the live video feed,
wherein the promotional content items are specific to a content provider associated with the broadcast provider system of the live video feed.

12. The method according to claim 8, further comprising encoding the generated second channel with channel metadata.

13. The method according to claim 12, wherein the channel metadata includes at least one of digital rights associated with the live video feed, timing information associated with at least one commercial break, a program schedule for playing at least one advertisement within at least one program segment of the live video feed, or signaling content of the live video feed.

14. The method according to claim 12, further comprising delivering the encoded second channel to the plurality of MVPDs at the first time specified in the received playout schedule,
wherein the encoded second channel is delivered via a communication medium of a network.

15. A non-transitory computer-readable medium having stored thereon, computer executable instructions that when executed by a processor in a computer, cause the computer to execute instructions, the instructions comprising:
in a television playout system provided in a broadcast provider system:
receiving a playout schedule from a playout schedule source,
wherein the playout schedule corresponds to a live video feed of a first channel, wherein the live video feed is broadcasted to at least one multichannel video program distributor (MVPD),
wherein the playout schedule specifies at least one of a first time of transmission of a second channel or at least one scheduling rule, and
wherein the at least one scheduling rule specifies a modification of content in the live video feed of the first channel;
generating the second channel comprising at least a first video on demand (VOD) content asset based on a version of a second VOD content asset,
wherein the second channel is generated based on a sanitization of the live video feed of the first channel,
wherein the live video feed of the first channel is sanitized by removal of a lower third graphical content overlay from the live video feed, and
wherein the second VOD content asset is transmitted to a plurality of MVPDs before transmission of the first VOD content asset to the plurality of MVPDs; and
transmitting the second channel to the plurality of MVPDs at first time specified in the received playout schedule.

16. The non-transitory computer-readable medium according to claim 15, the instructions further comprising generating the second channel based on insertion of a discontinuity between program segments,
wherein the discontinuity comprises dynamic ad insertion (DAI) within the program segments of the live video feed.

17. The non-transitory computer-readable medium according to claim 15, the instructions further comprising generating the second channel based on insertion of at least one of a unique source identifier or a second time associated with the content in the live video feed.

18. The non-transitory computer-readable medium according to claim 15, further comprising generating the second channel based on insertion of promotional content items and the at least one VOD content asset in the live video feed,
wherein the promotional content items are specific to a content provider associated with the broadcast provider system of the live video feed.

19. The non-transitory computer-readable medium according to claim 15, further comprising encoding the generated second channel with channel metadata.

20. The non-transitory computer-readable medium according to claim 19, wherein the channel metadata includes at least one of digital rights associated with the live video feed, timing information associated with at least one commercial break, a program schedule for playing at least one advertisement within at least one program segment of the live video feed, or signaling content of the live video feed.

21. The non-transitory computer-readable medium according to claim 19, further comprising delivering the encoded second channel to the plurality of MVPDs at the first time specified in the received playout schedule,
wherein the encoded second channel is delivered via a communication medium of a network.

* * * * *